US010266959B2

(12) United States Patent
Jiang et al.

(10) Patent No.: US 10,266,959 B2
(45) Date of Patent: Apr. 23, 2019

(54) ENHANCED TECHNIQUES FOR PRODUCTION OF GOLDEN BRONZE BY INTER-DIFFUSION OF TIN AND COPPER UNDER CONTROLLED CONDITIONS

(71) Applicant: Monnaie Royale Canadienne / Royal Canadian Mint, Ottawa (CA)

(72) Inventors: Taixiang Jiang, Ottawa (CA); Sridhar Bushigampala, Winnipeg (CA); Xianyao Li, Ottawa (CA)

(73) Assignee: MONNAIE ROYALE CANADIENNE / ROYAL CANADIAN MINT, Ottawa (Ontario) (CA)

( * ) Notice: Subject to any disclaimer, the term of this patent is extended or adjusted under 35 U.S.C. 154(b) by 413 days.

(21) Appl. No.: 14/441,740

(22) PCT Filed: Nov. 8, 2012

(86) PCT No.: PCT/CA2012/050795
§ 371 (c)(1),
(2) Date: May 8, 2015

(87) PCT Pub. No.: WO2014/071493
PCT Pub. Date: May 15, 2014

(65) Prior Publication Data
US 2015/0267312 A1   Sep. 24, 2015

(51) Int. Cl.
C25D 5/50       (2006.01)
C25D 5/10       (2006.01)
(Continued)

(52) U.S. Cl.
CPC ............. C25D 5/505 (2013.01); A44C 21/00 (2013.01); B32B 15/01 (2013.01); B32B 15/013 (2013.01);
(Continued)

(58) Field of Classification Search
CPC ...................................................... C25D 5/505
(Continued)

(56) References Cited

U.S. PATENT DOCUMENTS 2,463,412 A * 3/1949 Nachtman ............... C25D 5/505
                                                            204/210
2,490,700 A * 12/1949 Nachtman ................ C25D 5/10
                                                            148/530
(Continued)

FOREIGN PATENT DOCUMENTS

CN      102108533 A1    6/2011
JP      H07233499 A     9/1995
(Continued)

OTHER PUBLICATIONS

Machine translation of WO 2010/016562 as JP 5789375 of Tsujimoto et al. (Year: 2010).*

(Continued)

Primary Examiner — Brian W Cohen
(74) Attorney, Agent, or Firm — BakerHostetler

(57) ABSTRACT

Golden bronze appearance article, multiple-layer substrate, related methods and uses thereof, particularly for coinage blanks. Methods of producing an article having a golden bronze appearance include annealing a multiple-layer substrate at an annealing temperature for an annealing residence time. The multiple-layer substrate includes a core, contiguous to a copper layer and subsequent tin layer. The annealing temperature and annealing residence time are controlled in accordance with each other for allowing diffusion of the tin layer into the copper layer and producing an annealed substrate comprising an inter-diffused outer bronze layer having a golden appearance. The tin layer thickness is in accordance to the copper layer thickness such that the inter-diffused outer bronze layer has a tin content between about 8% wt. and about 15.8% wt. The core has a sufficiently (Continued)

low content of nickel to reduce or prevent formation of intermetallic compound comprising tin and nickel proximate to the core during annealing.

16 Claims, 14 Drawing Sheets

(51) Int. Cl.
    *C25D 3/30*     (2006.01)
    *C25D 3/38*     (2006.01)
    *A44C 21/00*     (2006.01)
    *B32B 15/01*     (2006.01)
    *C22F 1/00*     (2006.01)
    *C25D 5/34*     (2006.01)
    *C23F 1/00*     (2006.01)
    *C23F 17/00*     (2006.01)
    *C25D 3/22*     (2006.01)
    *C25D 5/52*     (2006.01)

(52) U.S. Cl.
    CPC ............... *C22F 1/00* (2013.01); *C22F 1/002* (2013.01); *C23F 1/00* (2013.01); *C23F 17/00* (2013.01); *C25D 3/22* (2013.01); *C25D 3/30* (2013.01); *C25D 3/38* (2013.01); *C25D 5/10* (2013.01); *C25D 5/34* (2013.01); *C25D 5/50* (2013.01); *C25D 5/52* (2013.01); *Y10T 428/12458* (2015.01); *Y10T 428/12715* (2015.01)

(58) Field of Classification Search
    USPC .................................................. 205/225–226
    See application file for complete search history.

(56) References Cited

U.S. PATENT DOCUMENTS

| | | | |
|---|---|---|---|
| 4,579,761 A | | 4/1986 | Ruscoe et al. |
| 4,917,967 A | * | 4/1990 | Cupolo .............. A44C 27/005 |
| | | | 428/669 |
| 5,139,886 A | | 8/1992 | Truong et al. |
| 5,151,167 A | | 9/1992 | Truong et al. |
| 2006/0286400 A1 | | 12/2006 | Mcdaniel et al. |

FOREIGN PATENT DOCUMENTS

| | | | |
|---|---|---|---|
| JP | 2008515050 A | 5/2008 | |
| WO | WO-2010016562 A1 * | 2/2010 | .............. C23F 1/18 |
| WO | 2012075572 A1 | 6/2012 | |

OTHER PUBLICATIONS

International Search Report (ISR) (PCT Form PCT/ISA/210) dated Jul. 15, 2013, in PCT/CA2012/050795.

* cited by examiner

BRONZE ALLOY WITH A GOLDEN BRONZE
REGION AND A PINK REGION
RESIDUAL COPPER LAYER
STRIKE LAYER
CORE

A

GOLD BRONZE ALLOY WITH VARYING
ALLOYING RATIOS OF COPPER AND TIN
STRIKE LAYER
CORE

B

LESS YELLOW LOOKING SLIGHTLY PINK

POSSIBLE RESIDUAL COPPER LAYER
STRIKE LAYER
CORE

C

ENHANCED TECHNIQUES FOR PRODUCTION OF GOLDEN BRONZE BY INTER-DIFFUSION OF TIN AND COPPER UNDER CONTROLLED CONDITIONS

REFERENCE TO RELATED APPLICATIONS

This application is the U.S. national stage of International Application No. PCT/CA2012/050795, filed Nov. 8, 2012, the disclosure of which is incorporated herein by reference in their entireties.

TECHNICAL FIELD

The technical field generally relates to the production of bronze such as bronze having a golden appearance. More particularly, the technical field relates to the production of a golden bronze alloy layer on substrates.

BACKGROUND

Bronze is commonly defined as an alloy of copper and tin. However, other metals can be used, defining different bronze alloy variations such as commercial bronze (copper, zinc), architectural bronze (copper, zinc, lead) or aluminum bronze (copper, aluminum, nickel). The color of the bronze depends on the composition of the different metals used in the production of the alloy. For instance, a copper-rich bronze alloy may have a reddish appearance whereas a tin-rich bronze alloy may have a silvery-white appearance. The golden appearance of bronze is the result of a certain metallic composition.

Bronze can be obtained as a solid alloy by pyrometallurgy or as a plated material. As a plated material, bronze made of copper and tin is traditionally obtained by using cyanide plating baths. Bronze can be deposited directly as an alloy if cyanide chemicals are used. The product is thus formed by co-depositing copper and tin as plating takes place. More particularly, cyanide plating solutions are used during the electroplating of coinage blanks to obtain a golden bronze alloy layer. For example, U.S. Pat. No. 4,579,761 (Ruscoe at al.) describes a method of making aureate colored coins, medallions and tokens and products so made. The product is electroplated with alkaline cyanide copper-tin plating bath and then introduced into an annealing furnace at a constant temperature. After a further cleaning treatment, Ruscoe et al. describe obtaining a product coated with a shiny gold colored bronze.

Almost all commercially available bronze plating operations use cyanide based plating solutions to obtain a gold like color metallic finish as such operations are relatively simple and well known. However, cyanide-based plating solutions are toxic and this toxicity can be long lasting and can pose health and safety risks to humans, animals and fish downstream from the source of unwanted spills and leaks. Disposal of the waste can be expensive and challenging since the chemicals used to destroy cyanides can also be toxic themselves.

Non-cyanide bronze can be obtained by plating processes using certain commercial formulations, but the results are usually poor because the plated products tend to come out in a reddish color, very much resembling copper, rather than goldish as one would often desire in the production of a bronze finish. The non-cyanide plating solutions tend to be unstable, expensive and difficult to control for consistent results and color. Non-cyanide bronze plating is thus an unpopular and rarely used technique, particularly when plating is done for large quantities of industrial products, such as coinage blanks.

Furthermore, in order to reduce the cost of coinage, pure metals such as nickel, copper or aluminum, and solid alloys such as cupronickel, cartridge brass or aluminum bronze are being replaced gradually with coins made of a less expensive material such as steel for the core, plated over with nickel, copper and bronze in a single layer, double layer or triple layer as outer layers covering the steel core. The steel for the core is sometimes replaced with zinc, or copper, or a low cost alloy such as cartridge brass as variations of the process. U.S. Pat. Nos. 5,151,167 and 5,139,886 describe coins coated with nickel, copper and then nickel and a process for making such coins with the use of non-cyanide plating solutions. These patents disclose that the resulting coins have a regular surface exempted of surface pinholes, which is normally a problem associated with successive metals electroplating followed by annealing diffusion. The use of non-cyanide plating solution has thus been described as feasible in the successive coating of nickel, copper and nickel. Brass is also made by plating copper, followed by plating zinc on top of copper with non-cyanide plating solutions. The successive deposition of copper and zinc is followed by diffusion of zinc into copper at high heat and temperature to obtain a brass alloy. This type of non-cyanide brass alloy production is commercially performed at the Royal Canadian Mint. However, unlike zinc in brass diffusion, tin does not easily diffuse into a copper matrix because of tin's low melting point. Thus, the production of golden bronze with the combination of copper and tin has various different challenges compared to production from copper and zinc.

A general method for plating various alloys without the use of cyanide solutions is described in U.S. patent application published under No. 2006/0286400 (McDaniel et al.). McDaniel et al. describe a method that includes the steps of electroplating a layer of a first metal onto a substrate, electroplating a second layer of a second metal onto the first electroplated layer, and heating the combination of the substrate to produce an alloy finish including a bronze alloy.

Multiply-electroplating methods to produce golden bronze without the use of cyanide solutions are disclosed in international patent application published under No. WO2012/075572 (Nguyen et al.). Nguyen et al. disclose a multiple-plating method including plating a substrate with at least one copper layer and a tin layer provided with a certain relative thickness ratio, and annealing the plated substrate at a gradually increasing temperature to produce an inter-diffused outer bronze layer having a golden appearance.

However, there remains a need for techniques that provide enhanced production of articles having a golden bronze finish.

SUMMARY OF INVENTION

The present invention responds to the above-mentioned need by providing techniques for enhanced production of golden bronze. It should be understood that golden bronze includes any bronze having a yellow gold color resembling gold, in other words a golden tone or gold appearance.

In some aspects, the techniques described herein include a method for enhancing the availability of tin for inter-diffusion with copper to form a golden bronze. The enhanced multiply-electroplating method facilitates the production of golden bronze by diffusion of tin into copper under controlled conditions.

It has been discovered that in the production of golden bronze by annealing a substrate plated with copper and tin layers, the presence of a nickel layer between the substrate core and the copper layer can, under certain operating conditions, lead to the tin being consumed by formation of intermetallic compounds. Due to the presence of nickel, ternary intermetallic dendritic phases comprising nickel, tin and copper can form in a region proximate to the interface of the nickel and copper layers and extending into the copper rich layer. This phenomenon reduces the availability of tin in the outer layer to form golden bronze by inter-diffusion with the copper. In addition, such tin consumption can lead to challenges in the production of a desirable golden bronze outer layer when the thickness of the copper layer is reduced, which may be desired for reducing the expense of thick copper plating layers that may be provided to provide certain properties to the substrates for production, such as Electromagnetic Signal (EMS) properties. Certain annealing temperatures and residence times can also favour tin consumption by nickel. Over-consumption of tin reduces its availability for inter-diffusion with copper and insufficient amounts of tin can lead to an undesired reddish colored bronze at the outer region. Increasing the thickness of the outer tin layer can increase the tin available for inter-diffusion with copper, but excessive amounts of tin and/or certain operating conditions can lead to undesired tin puddles on the surface of the bronze.

In one aspect, there is provided a method of producing an article having a golden bronze appearance. The method includes annealing a multiple-layer substrate including:

a core having an outer contact area;

a copper layer plated on the outer contact area of the core and having a copper layer thickness; and a tin layer plated on the copper layer;

wherein the contact area of the core has a sufficiently low content of nickel to reduce or prevent formation of intermetallic compounds comprising tin and nickel proximate to the outer contact area during the annealing;

wherein the annealing is performed at an annealing temperature for an annealing residence time, the annealing temperature and annealing residence time being controlled in accordance with each other for allowing diffusion of the tin layer into the copper layer and producing an annealed substrate comprising an inter-diffused outer bronze layer having a golden appearance; and wherein the tin layer is plated with a tin layer thickness in accordance with the copper layer thickness such that the inter-diffused outer bronze layer has a tin content between about 8% wt. and about 15.8% wt.

In an optional aspect of the method, the tin layer thickness may be such that the inter-diffused outer bronze layer has a tin content between about 10% wt. and about 15% wt.

In an optional aspect of the method, the method may include controlling the annealing temperature according to distinct temperature levels to allow the multiple-layer substrate to remain at each temperature level for a period of the annealing residence time. The method may also include controlling the annealing temperature to allow the multiple-layer substrate to remain at a constant temperature level for the annealing residence time.

In an optional aspect of the method, the annealing temperature may be between about 425° C. and about 815° C.

In an optional aspect of the method, the annealing may include passing the multiple-layer substrate through a plurality of heating zones operated at the controlled annealing temperature to heat the multiple-layer substrate to the corresponding annealing temperature. The annealing may be performed in an annealing apparatus including the plurality of heating zones. Optionally, the annealing may be performed in a rotary retort annealing furnace or a belt conveyor furnace.

In an optional aspect of the method, the annealing residence time may be between about 10 minutes and about 90 minutes. Optionally, the annealing residence time may be between about 20 minutes and about 30 minutes.

In an optional aspect of the method, the annealing may be performed under an annealing atmosphere having a controlled annealing composition. Optionally, the annealing composition may include at least one component for producing a reducing atmosphere.

In an optional aspect of the method, the method may further include plating the core with the copper layer to produce a copper plated substrate; and plating the copper plated substrate with the tin layer to produce the multiple-layer substrate.

In an optional aspect of the method, the method may further include etching on the copper layer with an acidic solution to produce an etched copper layer surface prior to plating the tin layer, such that adhesion of the tin layer is enhanced on the etched copper layer surface.

In an optional aspect of the method, the plating of the copper layer may be performed by electroplating with a non-acidic copper electroplating solution and wherein the plating of the tin layer is performed by electroplating with a tin electroplating solution comprising acidic, cyanide, non-cyanide, neutral, slightly basic solution or any combination thereof. Optionally, the non-acidic copper electroplating solution may be a non-cyanide and alkaline solution.

In an optional aspect of the method, the copper layer thickness may be between about 5 μm and about 45 μm.

In an optional aspect of the method, the tin layer thickness may be between about 1 μm and about 7 μm.

In an optional aspect of the method, the inter-diffused outer bronze layer may have a thickness which is between about 6 μm and about 35 μm.

In an optional aspect of the method, the copper layer may include a first plated copper layer having a first copper layer thickness and a second plated copper layer contiguous with the first copper layer and having a second copper layer thickness, and wherein the copper layer thickness is the sum of the first and second copper layer thicknesses. Optionally, the first copper layer thickness may be between about 3 μm and about 10 μm, and the second copper layer thickness may be between about 10 μm and about 35 μm.

In an optional aspect of the method, the multiple-layer substrate may further include a top metallic layer contiguous with the tin layer, the top metallic layer comprising copper and/or zinc and having a top layer thickness. Optionally, the top layer thickness may be sufficient to allow diffusion of the tin layer with the top metallic layer to produce the inter-diffused outer bronze layer and to reduce or prevent formation of tin puddles on the exterior surface during annealing. Optionally, the top layer thickness may be between about 0.1 μm and about 4 μm.

In an optional aspect of the method, the multiple-layer substrate may be a coinage blank.

In an optional aspect of the method, the core may be composed of steel, aluminum, brass, copper, alloys thereof, or a combination thereof.

In an optional aspect of the method, the outer contact area of the core may include no nickel.

In an optional aspect of the method, the outer contact area may include no metal or metallic compound capable of forming intermetallic dendritic phases in combination with tin. Optionally, the outer contact area may include a sufficiently low amount or no chromium to avoid formation of. intermetallic phases comprising chromium and tin.

In an optional aspect of the method, the method may further include quenching the annealed substrate in order to rapidly stop metallic inter-diffusion, to produce a quenched substrate.

In an optional aspect of the method, the method may further include burnishing the inter-diffused outer bronze layer of the quenched substrate to remove any undesired surface compounds and produce a burnished substrate having a golden appearance.

In an optional aspect of the method, the method may further include cleaning and drying the burnished substrate to reveal or enhance the golden appearance of the bronze.

In another aspect, there is provided a golden bronze appearance article including:
  a core having an outer contact area;
  a pink region contiguous with the outer contact area of the core and comprising annealing-induced inter-diffused copper and tin, the pink region having a tin content below about 8% wt. and having a sufficiently low content of nickel to have substantially no intermetallic phases comprising nickel and tin; and
  a golden bronze region contiguous with the pink region and comprising annealing-induced inter-diffused copper and tin, wherein the tin is completely inter-diffused with the copper and is present in a tin concentration between about 8% wt. and about 15.8% wt., the outer golden bronze region having an external surface with golden bronze appearance free of tin puddles.

In an optional aspect of the article, the external surface of the golden bronze region may be burnished and free of undesired surface compounds.

In an optional aspect of the article, the golden bronze region and the pink region may be produced by an annealing of two contiguous plating layers of (i) copper and (ii) tin having a tin-copper thickness ratio sufficient to produce the golden bronze region with obtain the tin concentration between about 8% wt. and about 15.8% wt.

In an optional aspect of the article, the golden bronze region and the pink region may be produced by an annealing of a first layer of copper, an intermediate layer of tin and a top layer of copper and/or zinc having respective thicknesses sufficient to produce the golden bronze region with the tin concentration between about 8% wt. and about 15.8% wt.

In an optional aspect of the article, the top layer of copper and/or zinc may have a thickness between about 0.1 μm and about 0.8 μm.

In an optional aspect of the article, the article may have a varying tin content from an interface between the core and pink region to the external surface of the golden bronze region. Optionally, the varying tin content may increase from the interface between the core and pink region to the external surface of the golden bronze region. Further optionally, the varying tin content may increase from the interface between the core and pink region to an intermediate area of the golden bronze region and decreases from the intermediate area of the golden region to the external surface of the golden bronze region.

In an optional aspect of the article, the core may include steel, aluminum, brass, copper, alloys thereof or a combination thereof.

In an optional aspect of the article, the golden bronze region may further include zinc inter-diffused with the copper and tin.

In an optional aspect of the article, the article may have the form of a coin, of a disk, of a flat object, or analogs thereof.

In another aspect, there is provided a multiple-layer substrate for use in the production of a golden bronze appearance article. The multiple-layer substrate includes
  a core having an outer contact area;
  a copper layer plated on the outer contact area of the core and having a copper layer thickness; and
  a tin layer plated on the copper layer;
  wherein the outer contact area of the core has a sufficiently low content of nickel to reduce or prevent formation of intermetallic compound comprising tin and nickel proximate to the outer contact area during an annealing treatment; and
  wherein the tin layer has a tin layer thickness in accordance to the copper layer thickness such that the tin layer and the copper layer inter-diffuse upon annealing treatment to form a bronze layer having a tin content between about 8% wt. and about 15.8% wt.

In an optional aspect of the substrate, the substrate may further include a top metallic layer including copper and/or zinc plated on the tin layer.

In another aspect, there is provided a use of the method as defined above to produce coinage blanks.

In another aspect, there is provided a use of the golden bronze appearance article as defined above as coinage.

In another aspect, there is provided a use of the multiple-layer substrate as defined above to produce a golden bronze appearance article by annealing.

In another aspect, there is provided a method of producing an article having a golden bronze appearance. The method includes annealing a multiple-layer substrate including:
  a core having an outer contact area;
  a copper layer plated on the outer contact area of the core and having a copper layer thickness;
  a tin layer plated on the copper layer and having a tin layer thickness; and
  a top metallic layer plated on the tin layer, the top metallic layer comprising copper and/or zinc and having a top layer thickness;
  wherein the annealing is performed at increasing annealing temperatures for an annealing residence time, the annealing temperatures and annealing residence time being controlled in accordance with each other for allowing diffusion of the tin layer into the copper layer and producing an annealed substrate comprising an inter-diffused outer bronze layer having a golden appearance; and
  wherein the tin layer thickness and the top layer thickness are sufficient to allow diffusion of the tin layer with the copper layer and the top metallic layer to produce the inter-diffused outer bronze layer having a tin concentration ranging from about 8% wt. to about 15.8% wt., and to reduce or prevent formation of tin puddles during the annealing.

In another aspect, there is provided a method of producing an article having a red bronze appearance. The method includes annealing a multiple-layer substrate including:
  a core having an outer contact area;
  a copper layer plated on the outer contact area of the core and having a copper layer thickness; and
  a tin layer plated on the copper layer;
  wherein the contact area of the core has a sufficiently low content of nickel to reduce or prevent formation of intermetallic compound comprising tin and nickel proximate to the outer contact area during the annealing;
  wherein the annealing is performed at an annealing temperature for an annealing residence time, the annealing temperature and annealing residence time being controlled in accordance with each other for allowing diffusion of the tin layer into the copper layer and producing an annealed substrate comprising an inter-diffused outer bronze layer having a golden appearance; and wherein the tin layer is plated with a tin layer thickness in accordance to the copper layer thickness such that the inter-diffused outer bronze layer has a tin content below about 8% wt.

In another aspect, there is provided a bronze article produced according to the methods described above.

It should be noted that any steps or features of the methods described above may be combined and/or adapted to any features of the bronze article and multiple-layer substrate described above without departing from the scoper of the present invention.

Figure 1:
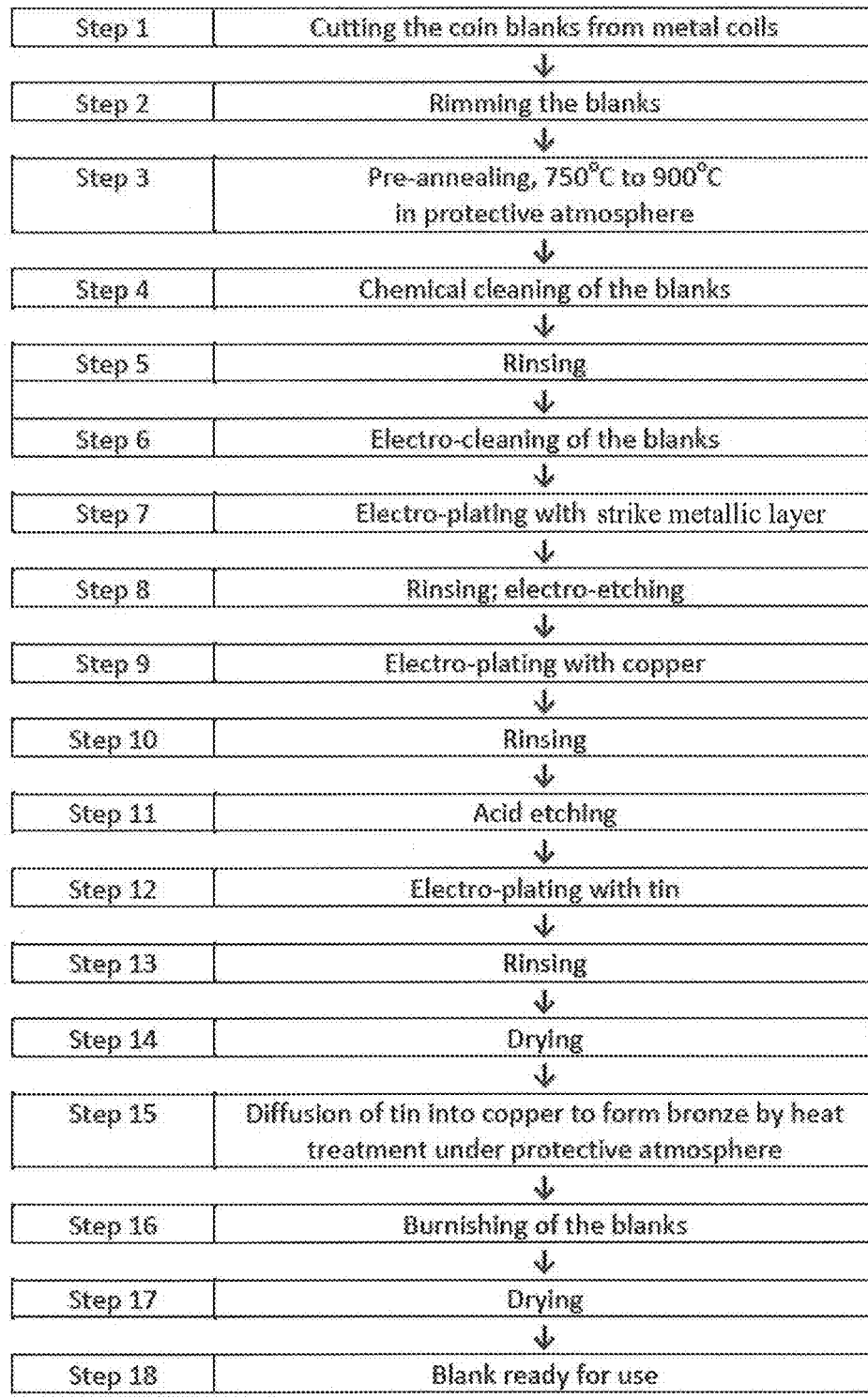
FIG. 1 is a block diagram showing the method steps for the formation of a bronze alloy layer on coinage blanks according to a preferred embodiment of the present invention.

While the invention will be described in conjunction with example embodiments, it will be understood that it is not intended to limit the scope of the invention to these embodiments. On the contrary, it is intended to cover all alternatives, modifications and equivalents as may be included as defined by the appended claims.

DETAILED DESCRIPTION

The present invention provides techniques for enhanced production of golden bronze as well as articles having a golden bronze appearance. While various examples described below are based on the production of a golden bronze layer on coinage blanks, it should be understood that the techniques described herein can also relate to other metallic articles such as articles that can be electroplated and annealed for providing golden appearance.

Bronze is an alloy of copper and tin. A layer of bronze can be plated on substrates by electroplating to form bronze articles. To perform the electroplating of a metal, an electrolytic cell is used. The electrolytic cell includes electrodes composed of a cathode and an anode. The substrate to be plated is the cathode and the anode is made of the metal to be plated on the substrate. The electrodes are immersed in an electroplating solution containing ions, cations and anions, and preferably corresponding cations of the metal to be plated. For example, if copper is electroplated, the electroplating solution contains $Cu^{2+}$ cations. The electroplating solution conducts the current supplied by a power supply connected to the electrodes. The metal of the anode is oxidized and releases corresponding metallic cations which interact with the anions of the electroplating solution. These cations are then reduced at the cathode and form the desired metallic deposit thereon.

In one aspect of the present invention, there is provided a multiple-layer plating method to produce bronze with a golden appearance. So as to obtain bronze, a substrate is plated with multiple metallic layers including at least one copper layer and a tin layer, which will be subjected to annealing for diffusion of tin into copper and formation of an outer golden bronze layer.

The substrate includes a core having an outer contact area that may include one or a plurality of materials that may be the same or different from the rest of the core. For example, the core and its outer contact area may be made entirely of steel, or steel plated with another metal such that the contact area is composed of that other metal. The contact area may include various metallic compounds such as steel, zinc, copper or a low cost alloy such as cartridge brass. The contact area of the substrate core has a sufficiently low content of nickel to reduce or prevent formation of intermetallic compounds comprising tin and nickel proximate to the contact area during the annealing. Optionally, the contact area of the core excludes nickel entirely. More regarding the effect of nickel will be discussed further below.

In another aspect, the method may include plating at least one copper layer on the contact area of the core to produce a copper plated substrate. The contact area of the substrate is therefore plated with copper such that the contact area is contiguous with the copper layer. Optionally, the copper plated substrate may include a core coated with two or more subsequent layers of copper that may have different thicknesses.

In another aspect, the method includes plating a tin layer on the copper plated substrate. The tin layer may be the outer layer of the multiple-layer substrate that is subjected to annealing. It should also be understood that the tin layer may include two or more contiguous tin plating layers that make up an overall tin layer. More regarding the tin layer will be discussed further below.

In another aspect, the tin layer may not be the outer layer of the multiple-layer substrate. For example, another metallic layer may be plated on top of the tin layer and may be referred to as a top flash layer (also referred to herein as a top metallic layer). The top flash layer may be composed of copper and/or zinc. Thus, the copper plated substrate may be plated with a tin layer and then a top flash layer may be plated thereon.

Referring to FIG. 1, the method may include the steps of successively depositing copper and tin on coinage blanks formed from metal coils. The steps 1 to 14 illustrated in FIG. 1 may be used to produce the multiple-layer substrate. The method may include electroplating a strike metallic layer on the coinage blank (step 7), which may be composed of a non-nickel metal or a metal wherein nickel in unavailable to consume tin to form intermetallic compounds. The strike layer may form the contact area on which the copper layer is plated. Alternatively, the strike layer may be a copper layer. The multiple-layer substrate having copper and tin layers may then be subjected to annealing in step 15. Additional steps such as burnishing and other post-annealing steps may then be performed in order to produce a finished product.

Still referring to FIG. 1, steps 2 to 8 are performed to obtain cleaned blanks before proceeding to the electroplating of copper in step 9. Tin is then plated in step 12. After each plating step, plated blanks are preferably to be rinsed as in steps 8, 10 and 13. The copper layer may be etched as in step 11 to promote and contribute to the adhesion of tin on copper during the electro-plating of step 12. The multiple-layer substrates are then submitted to a heat treatment under annealing temperature(s) allowing diffusion of tin into copper so as to form an inter-diffused outer bronze layer on the blanks in step 15. The blanks are then burnished in step 16 and dried in step 17. The plated bronze obtained by the diffusion of step 15, after cleaning and burnishing, has a nice bright yellow gold color or a dull yellow. As will be further described below, controlled conditions may be used in connection with the above mentioned steps to facilitate the copper-tin alloy equilibrium to take place in order to produce golden bronze.

Known copper electroplating solutions include acidic, non-acidic, cyanide, non-cyanide, neutral or slightly basic copper plating solutions. Acidic and cyanide copper electroplating solutions are usually preferred because of their low cost and efficiency. However, cyanide electroplating solutions contain cyanide anions $CN^-$ which may be toxic under certain conditions. Additionally, the outer contact area of the substrate core to be copper plated may be made of steel, which is a corrodible alloy under acidic conditions. In response to the substrate corrosion risk, some plating methods include plating a strike layer of protective metal, such as nickel, on the steel substrate before performing acidic copper plating. Alternatively, some implementations of the present method use non-acidic, non-cyanide electroplating solutions for plating copper directly onto the outer contact area of the substrate core. Optionally, the copper electroplating solution may be an alkaline copper electroplating solution. Optionally, the present method may include plating a first layer of copper on the substrate core using an alkaline electroplating solution, and plating a second layer of copper using an acidic electroplating solution for increased effectiveness and efficiency. Advantageously, the first copper layer may act as a protective strike layer with regard to any corrosion risk of substrate core. The use of non-acidic, non-cyanide copper electroplating solutions enables not plating the substrate core with a metallic strike layer composed of a metal, such as nickel, that may be expensive and could interfere in the diffusion process of tin into copper to form a golden bronze alloy.

More precisely, it has been discovered (see examples below) that the diffusion between the copper layer and the tin layer was limited by the presence of nickel in the outer contact area of the core, which is contiguous with the plated copper layer. More precisely, upon annealing, intermetallic compounds including tin and nickel, in the shape of dendrites, may be formed under certain annealing conditions within the inner copper-rich region and proximate to the outer contact area, especially when the plated copper layer is not thick enough. These intermetallic dendritic phases are mainly composed of tin, copper and nickel, indicating that a significant amount of tin can inter-diffuse with nickel and copper during annealing by forming such intermetallic compounds rather than participating with copper to the formation of the α-phase bronze alloy. During the diffusion process and under certain annealing conditions, activated and movable tin atoms of the tin layer may diffuse into the copper layer, and simultaneously, some activated and movable nickel atoms may diffuse into the plated copper layer through the interface between the copper layer and the outer contact area of the core. Surprisingly, as understood from the below examples and experimentation, the migration of nickel atoms appears to be preferentially encouraged as nickel atoms meet tin atoms at the diffusion interfaces when the intermediate copper layer is not thick enough. Nickel atoms are strongly segregated by tin atoms, and highly soluble in compositions including nickel and copper. As a result, the intermetallic compounds including tin and nickel may segregate and thus consume a considerable amount of tin which was initially supposed to inter-diffuse with copper to form bronze. The kinetics and thermodynamics of the diffusion of tin and nickel may favor the diffusion between tin and nickel even at low temperatures or even at room temperature.

Figure 2:
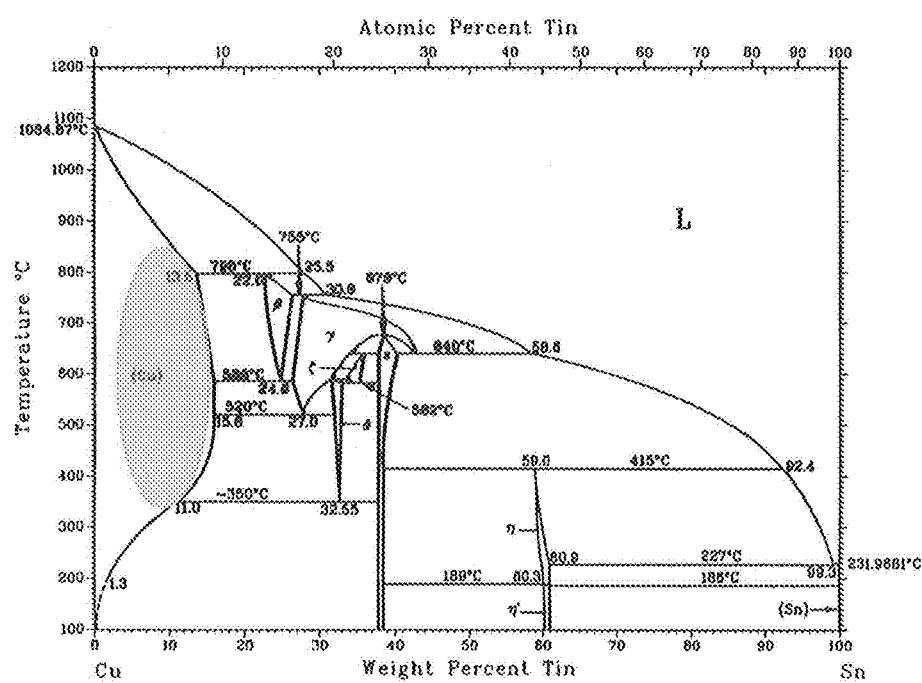
FIG. 2 is the binary phase diagram of the Cu—Sn alloy.

Referring to FIG. 2, the phase diagram of bronze alloy shows that bronze can exist in many composition combinations depending on the temperature and the proportion of copper and tin. In order to form a bronze layer having a durable and uniform golden color, a single α-phase of Cu—Sn alloy is desired, as highlighted in a circled area in the phase diagram of FIG. 2. To achieve a single α-phase of Cu—Sn alloy, an adequate thickness of tin layer and copper layer are be plated onto the contact area of the substrate. Additionally, various annealing conditions (annealing temperature, annealing residence time and annealing atmosphere composition) may be controlled such that an enhanced amount of tin participates to the formation of the α-phase Cu—Sn alloy, i.e. by improving the solubility of tin in α-phase and reducing second phases in which tin content is higher than its maximum solubility (about 15.8% wt.) in α-phase as indicated in the phase diagram of FIG. 2. Furthermore, various techniques described herein facilitate the reduction of tin unused in the α-phase Cu—Sn alloy, in the form of residual tin puddles on the outer surface of the bronze and/or within subsurface intermetallic dendrites or ternary phases.

Still referring to FIG. 2, in order to obtain the gold-like color for bronze, the method includes plating a tin layer with a sufficient thickness to obtain, after annealing, a bronze layer having a tin content between about 8% wt. and about 15.8% wt. There is a shift from yellow gold tone as the concentration of tin increases: the color shifts towards the light "whitish" metallic color of tin when the tin concentration is above about 15.8% wt. as unwanted tin rich phases such as β-phase may form in the diffused bronze layer. The color is pinkish gold when the tin content in the alloy is below about 8% wt.

Figure 5:
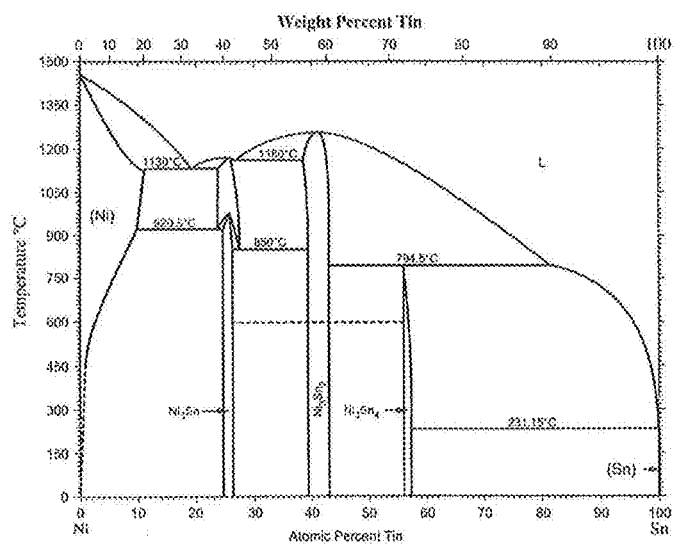
FIG. 5 is binary phase diagram of Sn—Ni equilibrium.
Figure 6:
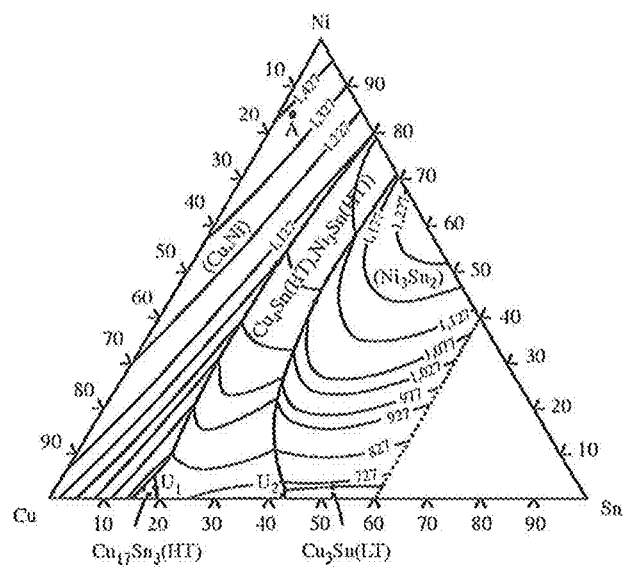
FIG. 6 is a ternary phase diagram of Sn—Ni—Cu equilibrium.

Referring to the phase diagrams of FIGS. 5 and 6, different intermetallic compounds may form among the ternary system (Cu, Sn, Ni) at certain compositions and temperatures. According to the present method, the formation of intermetallic compounds including tin and nickel can be reduced or avoided by reducing nickel content in or removing nickel from the outer contact area of the core, so as to reduce or prevent consumption of tin for other purposes than forming a golden bronze layer on the substrate.

Increasing the availability of tin to form bronze with the desired alloy composition may be challenging, especially because tin can be further consumed by the formation of the intermetallic compounds depending on the annealing conditions and the composition of the outer contact area of the core. Therefore, in one aspect of the present method, the contact area of the core has a sufficiently low content of nickel to reduce or prevent formation of intermetallic compounds including tin and nickel, thereby increasing the thickness of the bronze layer formed after annealing diffusion. This may also facilitate a broader window of operating parameters such as the metallic layer thicknesses, annealing temperatures and annealing residence time.

It should be understood that a sufficiently low amount of nickel includes an amount of nickel, in a dispersed form in the contact area of the core or as a very thin layer on the substrate core, that enables formation of a bronze alloy with a tin concentration between about 8% wt. and about 15.8% wt without interfering with the diffusion of tin with copper and/or forming intermetallic phases including tin and nickel. In addition, with a steel substrate core under certain annealing conditions, the plating of a sufficiently thin layer of nickel on the core may promote good diffusion between the steel core and the nickel, which could be beneficial for adhesion of the plated layers. This optional layer of nickel is sufficiently thin not to interfere with the diffusion of tin, as the nickel may be already diffused into steel for example. It should be noted that, when the core and/or contact area is corridible, non-acidic copper plating solutions are used to plate the subsequent copper layer on the contact area when there is no strike layer plated onto the core or when there is a strike layer with an insufficient thickness to avoid corrosion of the steel.

It should be understood that the contact area of the substrate core may not only include a sufficiently low amount of nickel, but may also include a sufficiently low amount of any tin-consuming compounds to reduce or prevent formation of intermetallic phases that include tin. For example, chromium may also be excluded from the contact area of the substrate.

In some aspects, after annealing, the multiple layers plated on the substrate have evolved into an annealed layer including a diffused layer. According to certain annealing conditions, the annealed layer may be a complete diffused layer, and according to other annealing conditions, the annealed layer may include a residual copper layer which is contiguous to the core of the substrate and the diffused layer which is contiguous to the residual copper layer. In other aspects, according to certain annealing conditions, the diffused layer may be a single golden bronze region having a tin content between about 8% wt. and about 15.8% wt., preferably between about 10% wt. and about 15% wt, throughout the region. Alternately, according to other annealing conditions, the diffused layer may include an outer golden bronze region and various transition regions, in which the tin content may vary from a high-tin content (about 15.8 wt %) proximate to the exterior surface of the golden bronze region, to a low-tin content proximate to the interface with the substrate core. For example, the diffused layer may include a copper-rich region (also referred to herein as a pink region) having a tin content below about 8% wt. which may be contiguous with the core, and a golden bronze region which is contiguous to the copper-rich region, both the copper-rich and golden bronze regions including annealing-induced inter-diffused copper and tin with a tin content increasing from the core to the outer surface of the golden bronze region.

In another aspect, in accordance with the annealing conditions, there may be advantageous ratios between the copper and tin layer thicknesses. To obtain a bronze layer having a tin content between about 8% wt. and about 15.8% wt after annealing, the relative thickness of the copper and tin layers to be plated may be controlled. Theoretically, any thickness of copper layer can be used. In the field of coinage blanks, the copper layer is preferably plated with a thickness between about 20 µm and about 25 µm. However, still in the field of coinage blanks, the copper layer thickness may be as thin as 10 µm and as thick as 30 µm. More generally, it should be noted that the thickness of the copper layer to be plated relates to the total thickness of the plated layers and the desired thickness of the annealed layer. For economic reasons, the tin layer thickness may be controlled such that it is compatible with the copper layer thickness to form a complete diffused layer being a substantially binary Cu—Sn alloy. More precisely, the thickness of the tin layer may be provided such that the annealed layer only includes a golden bronze region having the desired thickness and wherein the tin content between about 8% wt. and about 15.8% wt., preferably between about 10% wt. and 15% wt.

Figure 3:
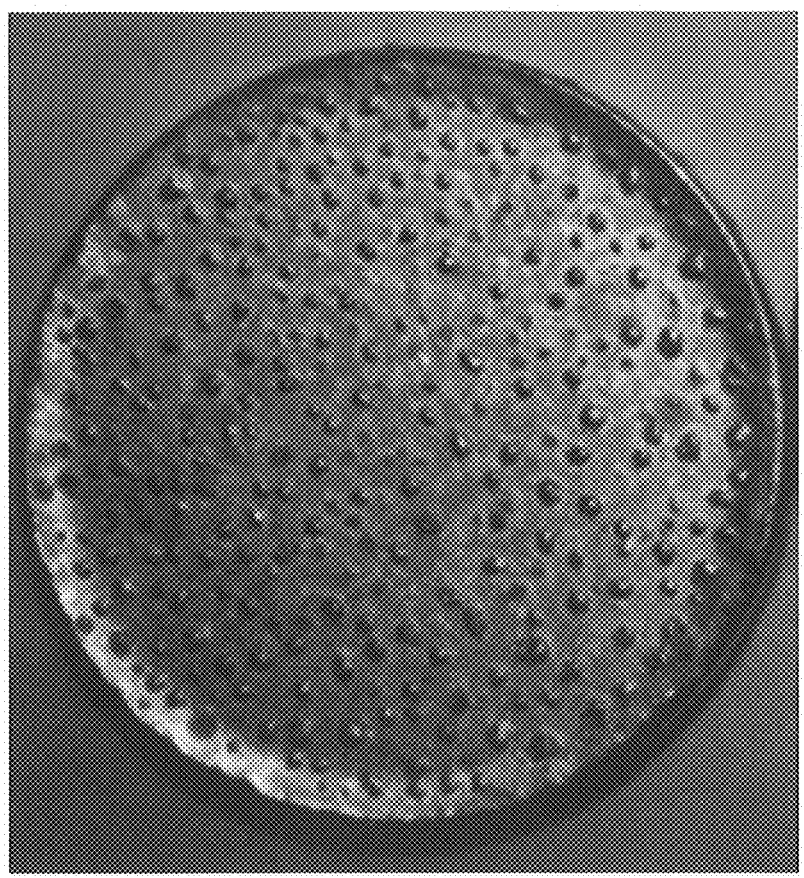
FIG. 3 is a photograph of a coinage blank with tin puddles.
Figure 4:
FIG. 4 is a photograph of a coinage blank with a gold-like color bronze surface produced by a method according to an embodiment of the present invention.

Referring to FIGS. 2 to 4, the ratio of tin layer thickness over copper layer thickness may be provided to enhance the formation of a golden bronze alloy. Theoretically, if the tin is plated with a thickness that is too thin relative to the copper layer, the formed bronze layer could appear in pinkish color because not enough tin diffused into copper such that "red bronze" (also referred to herein as copper-rich region) is formed under certain annealing conditions. For example, under certain annealing conditions, providing a thickness ratio $T(Sn)/T(Cu)$ that is smaller than about 1.3 µm/10 µm, could lead to obtaining a diffused layer which may tend to have relatively low tin content, such as a tin content of at most about 6% wt. In addition, if the thickness of the copper layer is insufficient or the thickness of the tin layer is in excess, the bronze is formed as an inner inter-diffused layer but the excess tin may form tin puddles on the exterior surface of the diffused layer under certain annealing conditions. FIG. 3 shows the residual tin puddles left on the exterior surface of the diffuse layer after annealing. For example, under certain annealing conditions, a thickness ratio T(Sn)/T(Cu) which is greater than about 3.0 μm/10 μm could lead to obtaining a diffused layer that may tend to have a relatively high tin content, such as a tin content of at least about 14% wt., with residual tin puddles. It should be noted that the annealing conditions may be provided in accordance with various thickness ratios T(Sn)/T(Cu) to obtain a diffused golden bronze region, for example as demonstrated in the below Examples.

Figure 8:
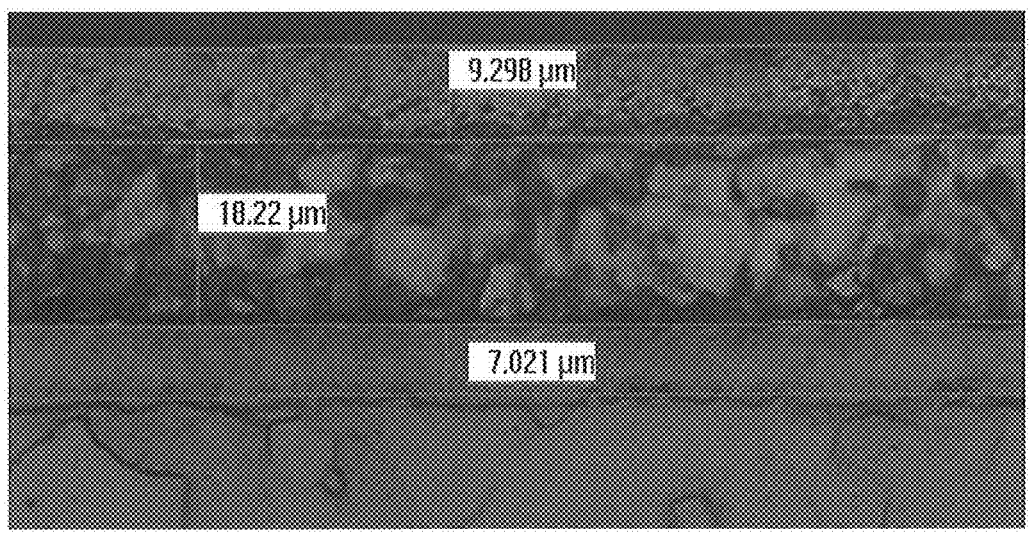
FIG. 8 is a cross sectional view of a coinage blank plated with 1.5 μm of tin, annealed until 750° C. during 25 minutes according to an embodiment of the present invention.

FIG. 4 shows the successful result on a coinage blank plated with 1.5 μm of tin and annealed at 750° C. for 25 minutes according to the present method. A golden bronze blank with a high tin composition and no surface tin puddles is obtained. The cross section of this same blank is shown on FIG. 8 wherein the multiple layers are easily observed.

In another aspect, the annealing residence time in the furnace and the annealing temperature may be provided and controlled to enhance the formation of golden bronze alloy. An appropriate annealing residence time allows substantial complete diffusion of tin to take place under the annealing temperature (as in step 15 of FIG. 1), thereby forming an inter-diffused outer bronze layer on the multiple-layer substrate. Optionally, the annealing residence time may range from 10 to 90 minutes, or from 20 to 50 minutes, depending upon the thickness of the diffused layer required. It should be understood that the annealing residence time may be set or controlled with a precision of more or less 5 minutes.

For example, the present method may include electroplating at least one copper layer onto a mild steel substrate, and electroplating a layer of tin with a tin layer thickness ranging between about 1.0 and about 5.0 μm. The at least one copper layer may include one or more copper layers between the core and the tin layer and may also include an outer copper layer on top of the tin layer. The at least one copper layer may be one copper layer having a copper layer thickness between about 3.0 μm and about 45.0 μm, to form golden bronze under certain annealing conditions. The at least one copper layer may also include a first copper layer having a first copper layer thickness between about 3.0 μm and about 10.0 μm, preferably about 5 μm, and a second copper layer having a second copper layer thickness between about 10 μm and about 35 μm, to form golden bronze under certain annealing conditions. Advantageously, as mentioned above, the first layer of copper may be plated using an alkaline copper plating solution especially when the core and/or contact area are made of corrodible material, and the second copper layer may be plated with an acidic copper plating solution. The first copper layer may be plated so as to provide desired EMS properties to the resulting plated substrate, to facilitate subsequent steps of the process.

The present invention may contribute to improved control of the composition of the bronze alloy according to the relative thickness of plated copper and tin.

Figure 7:
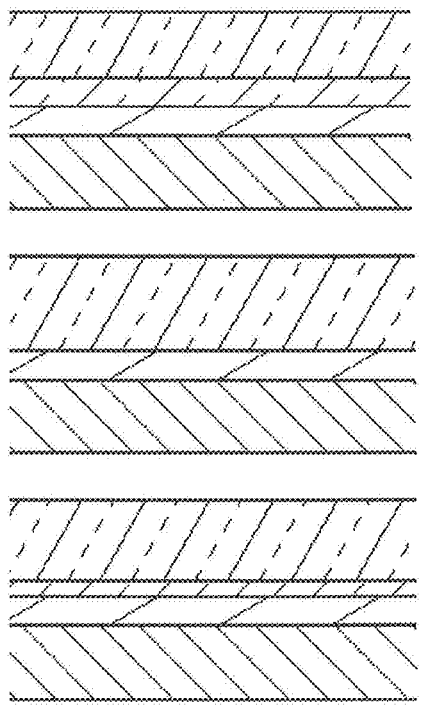
FIG. 7 is a schematic sectional view of three configurations of tin diffusion into copper.

In another aspect, the control of the relative thickness of the plated copper and tin layers may be done in conjunction with the control of the annealing residence time in the annealing furnace (step 15 in FIG. 1). FIG. 7 schematically shows three plated substrates that have been annealed during three different annealing residence times, corresponding to results A, B and C. Initially, each substrate is plated with a copper layer and a tin layer. Optionally, each substrate may be plated with a strike layer having a low content of nickel or excluding nickel. When the annealing residence time and temperature are appropriate and when there is enough copper and tin in the right proportion to give a bronze alloy with tin in the range from about 8% wt. to about 15.8% wt., the diffused layer is a single bronze region having a golden color with varying alloying ratios of copper and tin (B in FIG. 7). Depending on the annealing conditions and the nature of the strike layer, the strike layer may participate to the formation of the single bronze region with varying ratios of tin and copper. A residual layer of copper may be present when the copper has not completely inter-diffuse with the tin and the diffused layer therefore includes transition regions from a pink region to a golden bronze region (A in FIG. 7). When the residence time is relatively short and when there is not enough tin compared to copper, the alloy formed on the surface may be slightly less yellow and some residual copper may not have been alloyed yet with the tin (C in FIG. 7).

In another aspect, the method includes annealing the multiple-layer substrate during a sufficient annealing residence time to produce a golden bronze layer including annealing-induced inter-diffused copper and tin. A balance may be achieved between annealing temperature, annealing residence time (related to the diffusion rate) and combination of copper and tin layer thicknesses, to form a bronze alloy with the proper yellow gold color without creating residual tin puddles on the exterior surface of the annealed substrate.

In another aspect, the annealing may be performed in an annealing furnace. It should be understood that the annealing furnace includes any furnace allowing diffusion between metallic layers upon heat treatment. Optionally, the annealing furnace may include a plurality of heating zones wherein the annealing temperature is set or controlled facilitating the diffusion of tin into copper to produce a golden bronze. Different annealing temperature controls may be used to regulate the amount of energy available for heating, which results in defined heating zones having distinct temperature levels. In each heating zone, the annealing temperature control may be tailored such that the substrate is annealed at an annealing temperature level for a sufficient annealing residence time for proper diffusion. For example, the annealing temperature may be controlled such that it gradually increases from the first heating zone to the last heating zone. The gradual increase may be done linearly or in a stepwise manner. Alternately, the annealing temperature may be controlled to be substantially constant from the first heating zone to the last heating zone. Optionally, the annealing temperature in adjacent heating zones may be the same or different. In one example, the annealing furnace may include five heating zones which respectively have an annealing temperature of 425° C., 550° C., 675° C., 725° C., 815° C. Optionally, the annealing furnace may include multiple heating zones wherein the annealing temperature linearly raised from 425 to 815° C. Optionally, the annealing furnace may include multiple heating zones wherein the annealing temperature is set or controlled so as to be substantially constant and in the range between 425° C. and 810° C. in every heating zone.

In another aspect, the annealing furnace may include a belt conveyor or a rotary retort. The belt conveyor or rotary retort may also be set or controlled at a conveying or rotation speed which may be set to a constant conveying or rotation speed. Optionally, the conveyor or retort may be set or controlled at a constant conveying or rotation speed. The annealing furnace may also include a forced convection system to ensure even heat conduction and distribution. Optionally, the annealing furnace may also include a quenching device that is arranged at the exit of the last heating zone and connected to the conveyor or retort in order to perform instant abrupt quenching and stop the diffusion at the desired golden color. Optionally, the present method may include alternative cooling scenarios, such as using a water cooled belt conveyor or retort to ensure indirect cooling of the conveyed blanks in dry conditions.

In some aspects, the rotary retort furnace may be preferred to perform the annealing step because the multiple-layer substrates are agitated by rotation such that the entire exterior surface of the substrate is submitted to the annealing conditions, thereby facilitating obtaining a substantially uniform golden appearance of the bronze.

In another aspect, the annealing atmosphere composition may be preferably controlled because it can influence the transformation of available tin to tin oxide or a combination of tin and tin oxide, which in turn can impact the effectiveness of the burnishing (as in step 16 of FIG. 1) of the final product.

For example, the annealing atmosphere composition may be preferably a reducing protective environment including mixed gases such as $H_2$ and $N_2$, in a ratio of up to 20% of $H_2$. More generally, the annealing atmosphere may include various components resulting in a reducing protective environment. The reducing protective environment may be preferred to facilitate the production of bright golden yellow appearance of the annealed substrates and reduce or prevent oxidation during the annealing. The protective atmosphere could further be an exothermic protective atmosphere or an endothermic protective atmosphere. The annealing furnace may optionally have a controlled annealing atmosphere composition including air, nitrogen, or a mixture of nitrogen and hydrogen.

The present invention further provides a method using an annealing furnace including a plurality of heating zones where at least three parameters may be set or controlled to allow the formation of golden bronze: the relative tin plated thickness to the copper plated thickness, the annealing temperature and the annealing residence time. The method may further include controlling for example the annealing atmosphere composition.

In another aspect, the method may also include a step of burnishing the bronze formed by diffusion to remove oxides that may form during the annealing step. The presence of residual tin oxide or other metallic impurities oxides can cause problems during further minting of coin blanks for example. The burnishing step may include polishing the exterior surface of the outer bronze layer so as to reveal the bright and shine yellow gold color of the bronze.

It should be noted that, due to the dog-bone effect during electroplating, the thickness of the electroplated layers at the center of substrates such as coinage blanks is different from the one at the edge of the substrate. Obtaining a diffused outer bronze layer having a substantially constant thickness from the center to the edges is a major challenge.

In another aspect, the method may include plating a top metallic layer (also referred to herein as a top flash layer) on the tin layer to inter-diffuse with the available tin during the annealing step. The top metallic layer may be a copper layer or a zinc layer for participating in the formation of an outer bronze alloy layer. The plating of a top metallic layer may advantageously contribute to the formation of the bronze layer having a substantially constant thickness from the center to the edges of the article.

Referring to FIGS. 9 to 12, it has been discovered that a top metallic layer of copper or zinc may be plated onto the tin layer to reduce or eliminate tin residual puddles that may remain on the bronze layer after annealing under certain annealing conditions. The use of a top metallic layer can broaden the operating window of annealing conditions during the annealing step and the range of possible thickness proportions of the tin and copper plating layers. During annealing wherein multiple-layer plated blanks (substrates) are passed through the heating zones of the annealing furnace, the tin and copper layers are involved into two competing physical phenomena, which are melting and diffusion. The competition starts as soon as the annealing temperature on the plated blanks rises to the melting temperature of tin, i.e. 231.15° C. At this temperature, most of the tin layer has already diffused into the copper layer. However, upon increase of the annealing temperature above 231.15° C., remaining tin of the tin layer that has not diffused can melt and coalesce to form tin droplets on the inter-diffused bronze layer. Upon cooling when leaving the heating zones, the droplets solidify and remain as residual tin puddles on the exterior surface of the outer bronze layer. Even if these puddles can be small, they may be visible and cannot be removed during subsequent burnishing and cleaning steps. Indeed, it may be challenging and inefficient to burnish tin puddles off of the exterior surface of the outer bronze layer.

Figure 9:
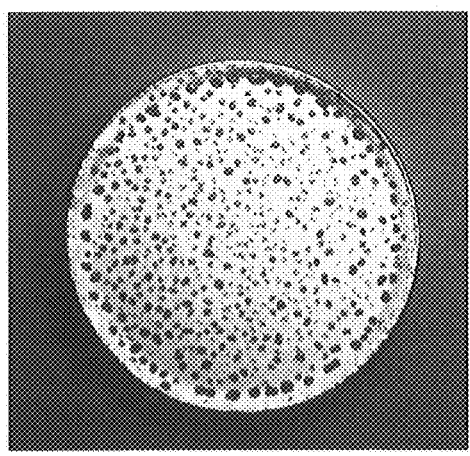
FIG. 9 is a photograph of a coinage blank with tin puddles.

Referring to FIG. 9, a blank was obtained by annealing a metallic substrate at a constant annealing temperature of 700° C. for an annealing residence time of 20 minutes, the substrate having been previously plated with a 23 micron alkaline copper layer and a 3 micron tin layer. Residual tin puddles appear to remain on the bronze surface of the blank.

Advantageously, the plating of an additional top layer of copper may reduce or prevent the formation of molten tin on the exterior bronze surface during annealing. Indeed, copper has a higher melting point (1085° C.) than tin. Consequently, on one hand, the top copper layer may provide copper atoms available for diffusion within the tin layer. On the other hand, the top copper layer remains solid under annealing conditions and may hold the molten remaining tin layer, thus minimizing the formation of tin droplets.

Figure 10:
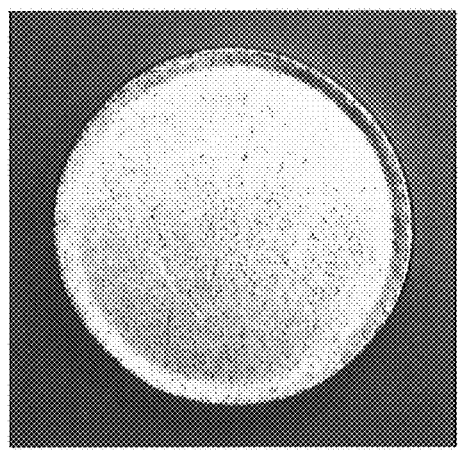
FIG. 10 is a photograph of a coinage blank with a gold-like color bronze surface produced by a method according to an embodiment of the present invention.

FIG. 10 shows one example of a copper-tin-copper plated blank, including a 0.3 micron top copper layer, which was annealed in exactly same conditions as the blank shown on FIG. 9. The residual tin puddles are eliminated from the exterior bronze surface of the blank because the tin layer completely diffused into the copper layer to form an outer bronze alloy layer. Additionally, the presence of the plated top copper layer may enable obtaining an increased thickness of the formed outer bronze layer. For example, by adding a top flash layer, the thickness of the plated tin layer may be increased from about 3 μm to about 4 μm, thus forming a thicker bronze layer than the one obtained in FIG. 9, while reducing or preventing the formation of tin puddles.

By reducing or removing nickel from the outer contact area of the core and adding a top metallic layer of copper or zinc, the present method provides solutions to increase the availability of tin to form a golden bronze alloy. Indeed, undesirable consumption of available tin in the formation of intermetallic dendritic phases or tin puddles is reduced or prevented by the present method.

According to various embodiments of the present method, the following method scenarios may be followed to produce a golden bronze layer on blanks (substrates).

It should be understood that various steps of the method described above could be associated with various additional cleaning, rinsing and/or drying steps.

Exemplary Scenarios

Scenario 1
1) Thorough cleaning, pickling and etching cleaning of mild steel blanks;
2) Electroplating copper (Cu) layer directly onto the mild steel blanks by using alkaline copper solution;
3) Electroplating tin (Sn) on the previously alkaline copper plated blank. The tin thickness is in a range of about 1.0 μm to about 5.0 μm depending upon the thickness of the bronze layer required;
4) A very thin layer of copper plating is then plated onto previously plated Sn/Cu. This top flash thin layer of copper is about 0.2 μm to about 0.8 μm, is plated in order to reduce or eliminate residual tin puddles and achieve uniform surface color upon annealing; a multiple-layer blank is obtained;
5) The multiple-layer blank is annealed at a certain set of annealing conditions (550° C. to 750° C. for 20 to 80 min in a reducing atmosphere in an annealing furnace);
6) The annealed blank is then properly cooled; and
7) The cooled blank is burnished to produce a ready to strike (RTS) blank.

Scenario 2
1) Thorough cleaning, pickling and etching cleaning of mild steel blanks;
2) Electroplating copper layer directly onto the mild steel blanks by using alkaline copper solution;
3) Electroplating tin on the previously alkaline copper plated blank. The tin thickness is in a range of about 1.0 μm to about 5.0 μm depending upon the thickness of the bronze layer required;
4) A very thin layer of zinc plating is then plated onto previously plated Sn/Cu. This thin layer of zinc is about 0.2 μm to about 0.8 μm, is plated in order to reduce or eliminate any residual tin puddles and achieve uniform surface color upon annealing; a multiple-layer blank is obtained;
5) The multiple-layer blank is annealed at a certain set of annealing conditions (550° C. to 750° C. for 20 to 80 min in a reducing atmosphere in an annealing furnace) so that a ternary bronze of Sn, Zn and Cu is formed;
6) The annealed blank is then properly cooled; and
7) The cooled blank is burnished to produce a ready to strike (RTS) blank.

Scenario 3
1) Thorough cleaning, pickling and etching cleaning of mild steel blanks;
2) Electroplating copper layer directly onto the mild steel blanks by using alkaline copper solution;
3) Electroplating tin on the previously alkaline copper plated blank. The tin thickness is in a range of about 1.0 μm to about 5.0 μm depending upon the thickness of the bronze layer required; a multiple-layer blank is obtained;
4) The multiple-layer blank is annealed at a certain set of annealing conditions (550° C. to 750° C. for 20 to 80 min in a reducing atmosphere in a furnace);
5) The annealed blank is then properly cooled; and
6) The cooled blank is burnished to produce a ready to strike (RTS) blank.

Scenario 4
1) Thorough cleaning, pickling and etching cleaning of mild steel blanks;
2) Electroplating copper layer directly onto the mild steel blanks by using alkaline copper solution. The alkaline copper layer acts as a strike layer and its thickness is about 3.0 to about 8.0 μm;
3) A thicker copper is then plated onto previously plated blanks. This copper plating is in between about 10 μm to about 35 μm. This copper plating can be done by using any kinds of copper plating solution, such as alkaline, acidic, cyanide or non-cyanide copper plating solutions, preferably using acidic copper solution;
4) Electroplating tin on the previously alkaline copper plated blank. The tin thickness is in a range of about 1.0 μm to about 5.0 μm depending upon the thickness of the bronze layer required;
5) A very thin layer of copper plating is then plated onto previously plated Sn/Cu. This thin layer of copper is about 0.2 μm to about 0.8 μm, is plated in order to eliminate residual tin puddles and achieve uniform surface color upon annealing; a multiple-layer blank is obtained;
6) The multiple-layer blank is annealed at a certain set of annealing conditions (550° C. to 750° C. for 20 to 80 min in a reducing atmosphere in a furnace);
7) The annealed blank is then properly cooled; and
8) The cooled blank is burnished to produce a ready to strike (RTS) blank.

Scenario 5
1) Thorough cleaning, pickling and etching cleaning of mild steel blanks;
2) Electroplating copper layer directly onto the mild steel blanks by using alkaline copper solution;
3) Electroplating a thin copper layer of about 2 μm to about 3 μm onto previously alkaline copper by using acidic copper solution;
4) Electroplating tin on the previously copper plated blank. The tin thickness is in a range of about 1.0 μm to about 5 μm depending upon the thickness of the bronze layer required;
5) A very thin layer of zinc plating is then plated onto previously plated Sn/Cu. This thin layer of copper is about 0.2 μm to 0.8 μm, is plated in order to eliminate any residual tin puddles and achieve uniform surface color upon annealing; a multiple-layer blank is obtained;
6) The multiple-layer blank is annealed at a certain set of annealing conditions (550° C. to 750° C. for 20 to 80 min in a reducing atmosphere in a furnace);
7) The annealed blank is then properly cooled; and
8) The cooled blank is burnished to produce ready to strike (RTS) blank.

It should be understood that in step 2 of each scenario above, the alkaline copper plating solution may be replaced by a cyanide copper plating solution or non-acidic for a steel substrate.

The influence of the above mentioned operational parameters of the present method may be demonstrated through the following examples.

EXAMPLES

A series of experiments have been performed to identify an effective operating window including parameters such as the relative thickness of copper and tin, the annealing temperature of the furnace, the annealing residence time and the composition of the annealing atmosphere inside the furnace. Examples 1 to 4 are provided to show the benefits of removing nickel from the outer contact area of the substrate core, and of adding a top metallic layer of copper or zinc.

The blanks that were used have a steel core and are plated with approximately 4 to 8 μm of nickel and 14 to 25 μm of copper at the center of the blanks. Barrel plating was used for the experiments. Preferably, the blanks may have a steel core and are plated directly with copper layers onto the steel, and then plated with different thicknesses of tin and a top flash copper.

It should be noted that, unless otherwise mentioned, the thickness values provided throughout the examples are the ones at the center of the multiple-layer substrate (coinage blank).

Barrel plating techniques with the following conditions were used to produce the blanks.

Alkaline Copper Plating

The composition of the alkaline copper plating solution is the following:

E-Brite Ultra Cu: 40% by volume
E-Brite Ultra Cu-E: 10% by volume
E-Brite Ultra Cu-pHA: 10% by volume The copper electroplating was performed under the following conditions:

pH value: 9.8±0.2
Temperature: 49° C.±2° C.
Current density: 0.2-0.5 A/dm$^2$

Tin Plating

The composition of the tin plating solution is the following:

Stannous Sulphate: 20.0 grams/liter
Sulphuric Acid: 8.0% by volume
Stannolume NF Carrier: 2.0% by volume
Stannolume NF Additive: 0.1% by volume The tin electroplating was performed under the following conditions:

Temperature: 20° C.±2° C.
Current density: 0.25 A/dm$^2$

Example 1

1.1 Experimental Conditions

A multiple plated coin blank including a 5 μm nickel layer, a 20 μm copper layer and a 2.5 μm tin layer was annealed at 650° C. for 60 minutes at a reducing environment. It should be noted that these thicknesses have been measured at the center of the plated blank. During electroplating, due to different electric current distributions at the center and at edge of the blank, the plating thickness of the different layers varies across the entire surface of blank. This is referred to as dog-bone effect, i.e., the plating is thicker at the edge than at the center.

1.2 Results

Figure 11:
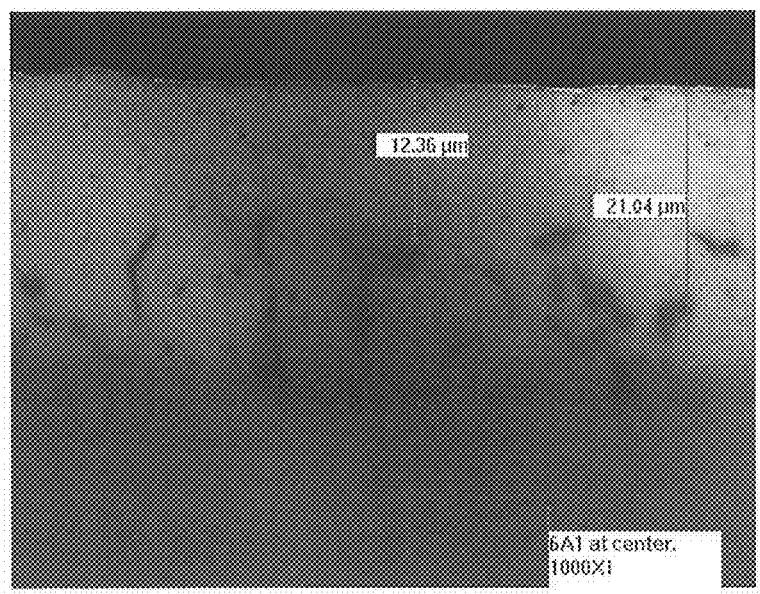
FIG. 11 is a cross sectional view of the center of a coinage blank plated with a 5 μm nickel layer, a 20 μm copper layer and a 2.5 μm tin layer and annealed at 650° C. for 60 minutes according to an embodiment of the present invention.
Figure 12:
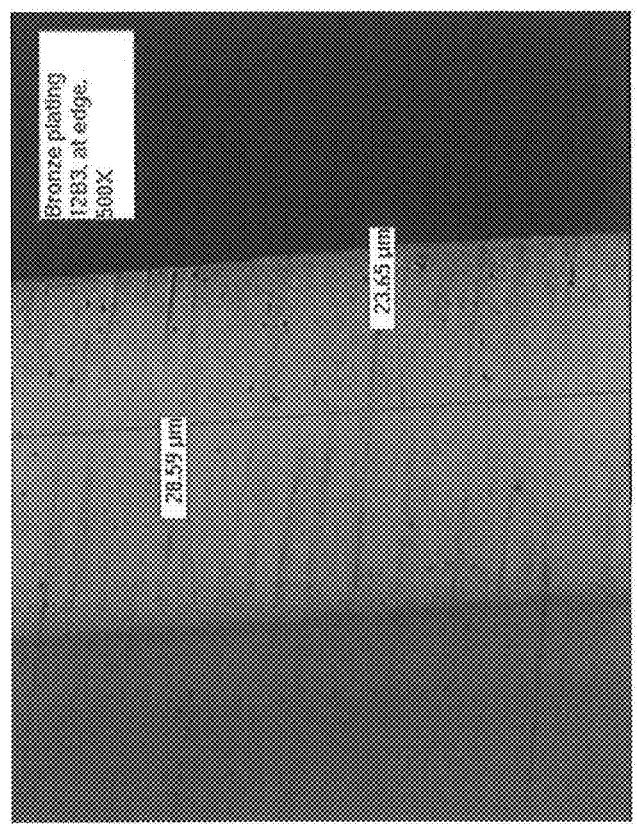
FIG. 12 is a cross sectional view of the edge of a coinage blank plated with a 5 μm nickel layer, a 20 μm copper layer and a 2.5 μm tin layer and annealed at 650° C. for 60 minutes according to an embodiment of the present invention.

FIGS. 11 and 12 are optical microscopic views of the blank cross section respectively at its center and at one edge. In FIG. 11, it is seen that upon diffusion, a diffused layer with a golden bronze color was formed up to the depth of 12.36 μm, below which a pink layer exists. The pink layer includes copper-rich phases and nickel-rich phases. Copper-rich phases include a lower amount of tin and a higher amount of copper. Nickel-rich phases are noticeable as dark grey dendritic phases extending from the core through the pink layer to close to the interface between the golden bronze layer and pink layer. These dendritic phases are relatively uniformly distributed in a depth of between about 12 μm to about 20 μm from the top surface. However, in FIG. 12, at the edge of the same blank, no such dark grey dendritic phases are observable, although bronze top layer and pink layer are clearly present. It should be pointed out that some small grey diffused products were noted in the interface between copper and nickel, indicating slight inter-diffusion of nickel into copper.

Example 2

2.1 Experimental Conditions

A multiple plated coin blank including a 25 μm copper layer and a 2.5 μm tin layer was annealed at a constant annealing temperature of 700° C. for an annealing residence time of 30 minutes at a reducing environment. It should be noted that these thicknesses have been measured at the center of the plated blank.

2.2 Results

Figure 13:
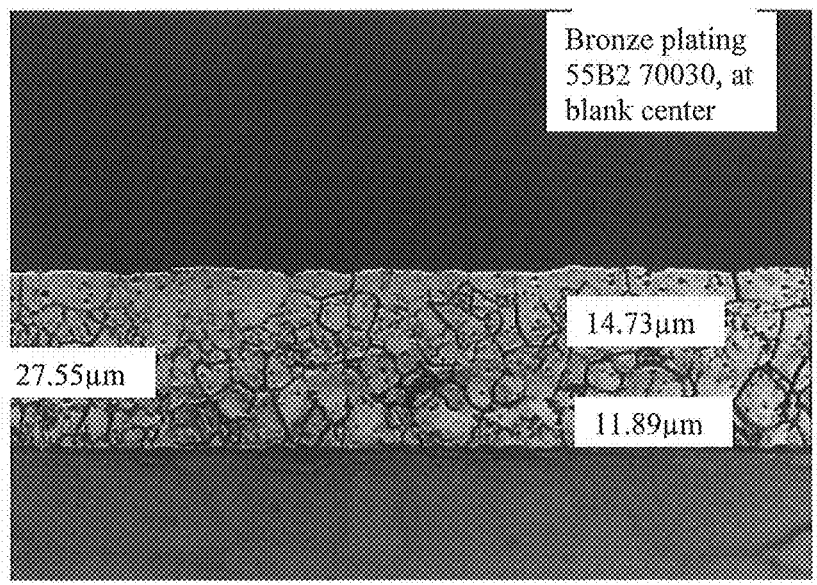
FIG. 13 is a cross sectional view of the center of a coinage blank plated with a 25 μm copper layer and a 2.5 μm tin layer and annealed at 700° C. for 30 minutes according to an embodiment of the present invention.
Figure 14:
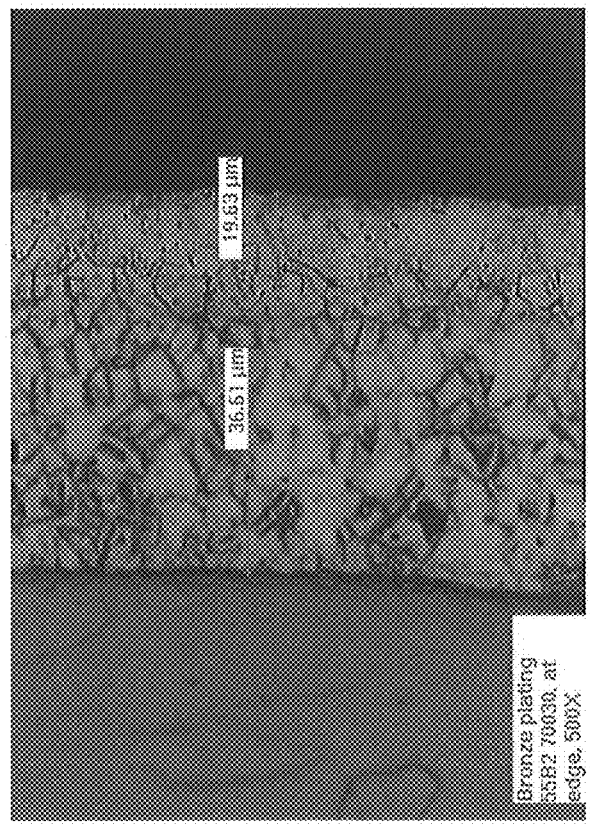
FIG. 14 is a cross sectional view of the edge of a coinage blank plated with a 25 μm copper layer and a 2.5 μm tin layer and annealed at 700° C. for 30 minutes according to an embodiment of the present invention.

The cross sections of the respective center and edge of an etched blank are shown in FIGS. 13 and 14. FIGS. 13 and 14 show that no dark-grey dendritic phases were formed in the pink region of the diffused layer. The thickness of the golden bronze layer, both at the center and at the edge of the plated blank, is relatively uniform and the diffused golden bronze layer is apparently thicker than in the case where the blank was initially plated with a nickel layer (Example 1).

Example 3

3.1 Experimental Conditions

A multiple plated coin blank including a 23 μm alkaline copper layer, a 2.0 μm tin layer and a 0.3 μm top copper layer was annealed at a constant annealing temperature of 700° C. for an annealing residence time of 30 minutes at a reducing environment composed of 15% of $H_2$ and 85% of $N_2$.

3.2 Results

Figure 15:
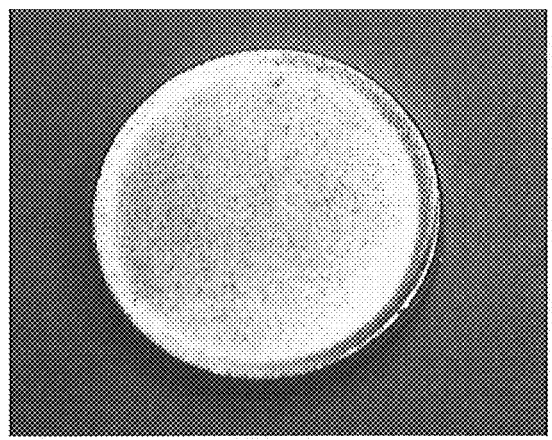
FIG. 15 is a photograph of a coinage blank with a gold-like color bronze surface produced by a method according to an embodiment of the present invention.
Figure 16:
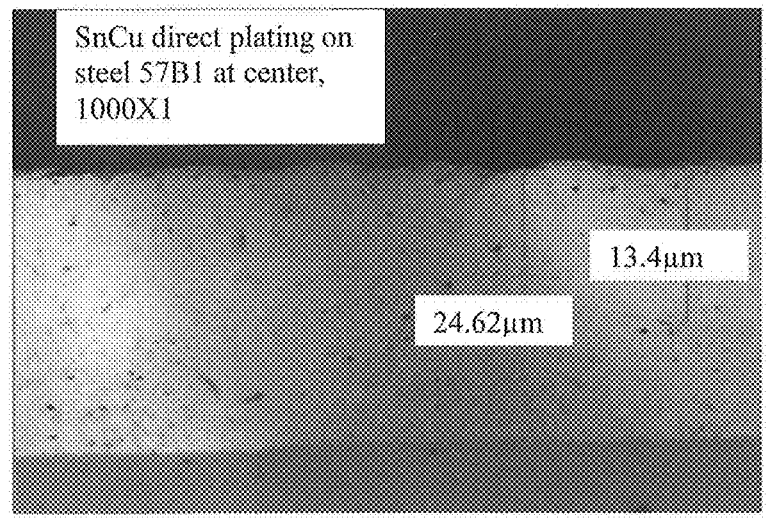
FIG. 16 is a cross sectional view of the coinage blank of FIG. 15.
Figure 17:
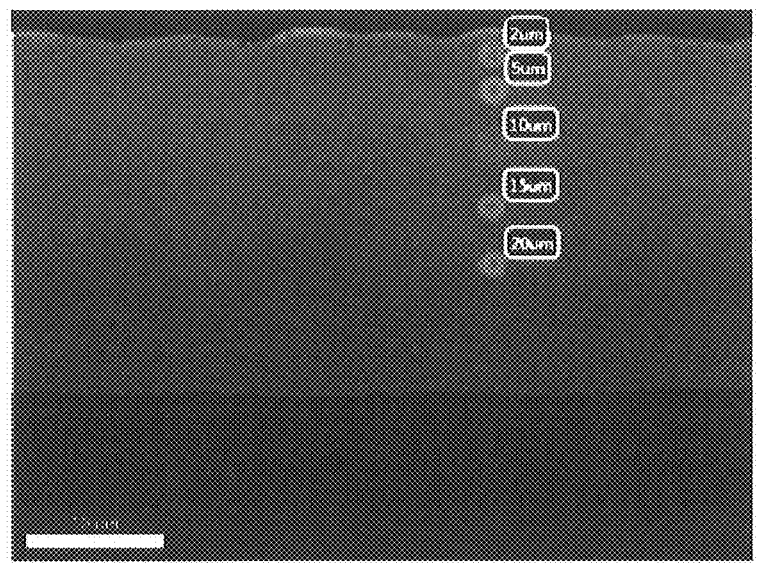
FIG. 17 is a cross sectional view of a center of a coinage blank plated with a 23 μm alkaline copper layer, a 2.0 μm tin layer and a 0.3 μm top copper layer and annealed at 700° C. for 30 minutes according to an embodiment of the present invention.
Figure 18:
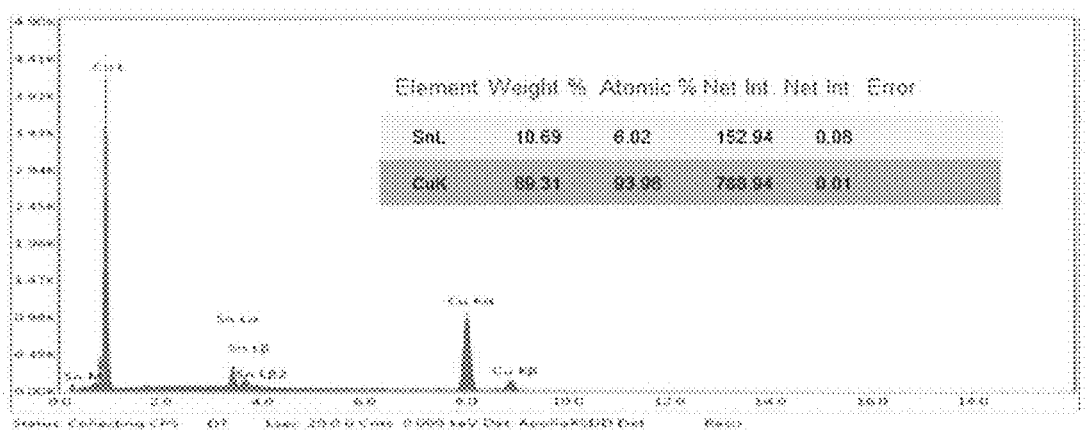
FIG. 18 is an EDS analysis indicating Sn % in the bronze layer of the annealed blank of FIG. 17.

FIG. 15 shows the obtained blank after annealing. The blank has a uniform golden bronze layer. FIG. 16 shows the optical microscopic view of the cross section of the annealed blank of FIG. 17. It can be seen again that, without nickel, no dark-grey dendritic phase was formed. It should also be noted that the thickness of the golden bronze relatively to the pink layer is larger than in the case where the blank was not plated with a top copper layer (see Example 2). The ratio of the golden bronze layer thickness over the pink layer thickness is superior to 1 and it appears that the top copper layer fully participated in a uniform diffusion in the golden bronze layer. Consequently, the absence of a nickel layer and the use of a top copper layer may promote the diffusion between tin and copper under certain annealing conditions of the present method. From the Scanning Electron Microscope (SEM) analysis shown in FIGS. 16 and 17, a uniform golden bronze layer may be formed on the blank including 11% of tin in the top bronze layer as illustrated by the EDS (Energy Dispersive X-ray Spectroscopy) analysis of FIG. 18.

Example 4

4.1 Experimental Conditions

A multiple plated coin blank including a 5 μm nickel layer, a 20 μm alkaline copper layer, a 5.0 μm tin layer and a 0.3 μm top zinc layer was annealed at a constant annealing temperature of 650° C. for an annealing time of 60 minutes at a reducing environment. It should be noted that these thicknesses have been measured at the center of the plated blank.

4.2 Results

Figure 19:
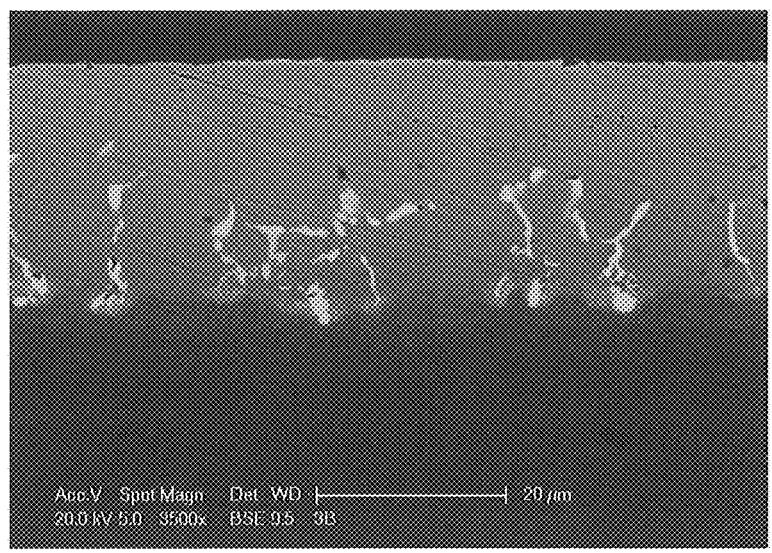
FIG. 19 is a cross sectional view of a center of a coinage blank plated with a 5 μm nickel layer, a 20 μm acid copper layer, a 5.0 μm tin layer and a 0.3 μm top zinc layer and annealed at 650° C. for 60 minutes according to an embodiment of the present invention.
Figure 20:
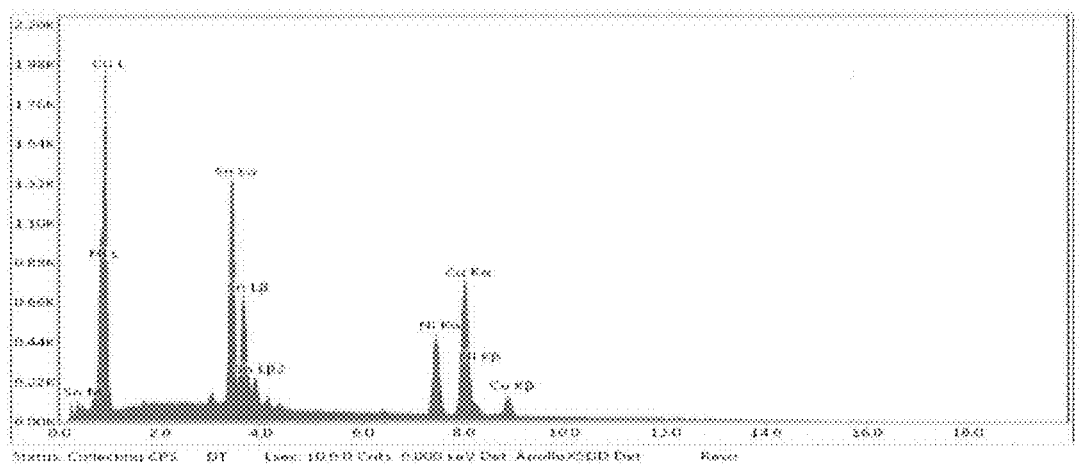
FIG. 20 is an EDS analysis indicating Sn % in the bronze layer of the annealed blank of FIG. 19.

The back scattering electron microscopic cross section view of the center of the annealed blank shown on FIG. 19 includes dendritic phases in a subregion of the blank. The SEM analysis shown on FIG. 20 reveals that these dendritic phases contain a significant amount of nickel, even from 10 to 14 μm away from the nickel layer, in contrast with the surrounding copper-rich phases wherein much less nickel is observed. More precisely, the nickel content in these dendritic phases is high as 20% wt., whereas the nickel content in the surrounding cooper-rich area is much less than 2% wt. These results suggest that new phases containing tin, nickel and copper can be formed as a result of diffusion among these elements, that a considerable amount of nickel atoms can travel upwards, and that a considerable amount of tin atoms can be consumed by formation of Ni—Cu—Sn ternary intermetallic compounds. These results therefore imply that tin may insufficiently participate in the formation of the bronze layer.

Figure 21:
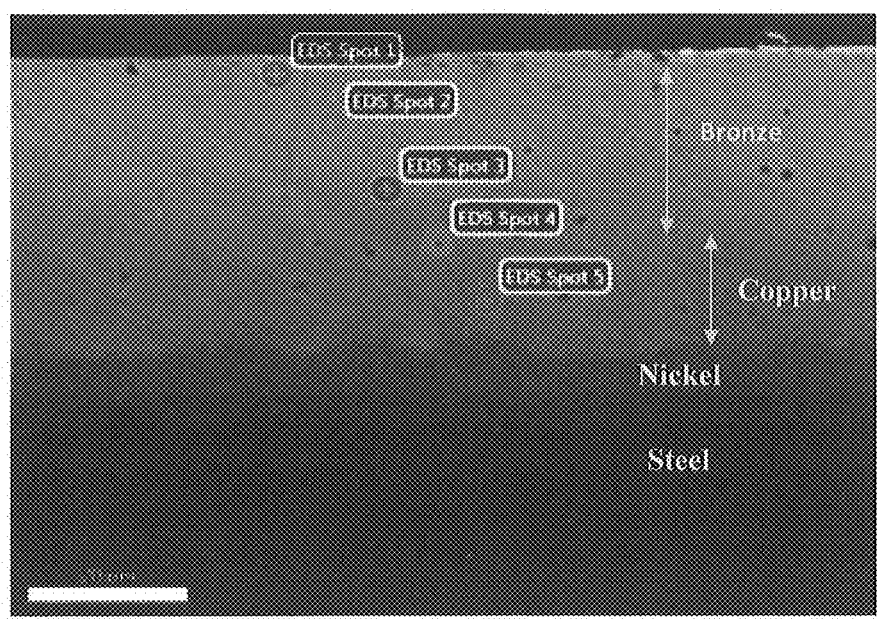
FIG. 21 is a cross sectional view of an edge of a coinage blank plated with a 5 μm nickel layer, a 20 μm acid copper layer, a 5.0 μm tin layer and a 0.3 μm top zinc layer and annealed at 650° C. for 60 minutes according to an embodiment of the present invention.

As seen in FIG. 21, when the intermediate copper layer is thick enough before annealing, for example at the edge of the blank, no ternary intermetallic compounds containing nickel and tin are observed after annealing. The EDS analysis of FIG. 21 showed that nickel diffused into the copper layer but the nickel content was inferior to the one found in the dendritic phases of FIG. 19. In general, it may be difficult for copper to diffuse into nickel which was also confirmed by the EDS analysis. That is one of the main reasons why nickel may be used as a barrier layer to prevent copper to diffuse into other metals, such as gold.

It should be understood that embodiments of the method described above may be adapted to produce a diffused layer of red bronze, i.e. by plating tin with a tin layer thickness such that the diffused red bronze has a tin concentration below about 8% wt.

The invention claimed is:

1. A method of producing an article having a golden bronze appearance, the method comprising:
   providing a multiple-layer substrate comprising:
      a core having an outer contact area;
      a copper layer plated on the outer contact area of the core and having a copper layer thickness;
      a tin layer plated on the copper layer and having a tin layer thickness, the tin layer thickness being selected in accordance with the copper layer thickness according to a thickness ratio of tin over copper between 1:12 and 1:5; and
      a top metallic layer plated on the tin layer and having a top layer thickness, the top metallic layer comprising at least one of copper and zinc; and
   annealing the multiple layer substrate at an annealing temperature between about 425° C. and about 815° C. for an annealing residence time, the annealing temperature and annealing residence time being controlled in accordance with each other to allow diffusion of the tin layer into the copper layer and the top metallic layer, and produce an annealed substrate comprising an inter-diffused outer bronze layer having a golden bronze appearance with a tin content between 8% wt. and 15.8% wt,
   wherein the outer contact area of the core comprises no nickel to reduce or prevent formation of intermetallic compounds comprising tin and nickel proximate to the outer contact area during the annealing; and
   wherein the top metallic layer thickness is between 0.1 μm and 4 μm, the top layer thickness being in accordance with the tin layer thickness and with the copper layer thickness to prevent formation of tin puddles on an exterior surface of the article during production of the inter-diffused bronze layer upon annealing.

2. The method according to claim 1, comprising controlling the annealing temperature according to distinct temperature levels to allow the multiple-layer substrate to remain at each temperature level for a period of the annealing residence time.

3. The method according to claim 2, wherein the annealing comprises passing the multiple-layer substrate through a plurality of heating zones operated at the controlled annealing temperature to heat the multiple-layer substrate to the corresponding annealing temperature.

4. The method according to claim 1, wherein the annealing residence time is between 10 minutes and 90 minutes.

5. The method according to claim 1, wherein the annealing is performed under an annealing atmosphere having a controlled annealing composition comprising at least one component for producing a reducing atmosphere.

6. The method according to claim 1, further comprising:
   plating the core with the copper layer to produce a copper plated substrate; and
   plating the copper plated substrate with the tin layer to produce a tin plated substrate.

7. The method according to claim 6, wherein the plating of the copper layer is performed by electroplating with a non-acidic copper electroplating solution and wherein the plating of the tin layer is performed by electroplating with a tin electroplating solution comprising acidic, cyanide, non-cyanide, neutral, slightly basic solution or any combination thereof.

8. The method according to claim 1, wherein the copper layer thickness is between 5 μm and 45 μm.

9. The method according to claim 1, wherein the tin layer thickness is between 1 μm and 7 μm.

10. The method according to claim 1, wherein the inter-diffused outer bronze layer has a thickness which is between 6 μm and 35 μm.

11. The method according to claim 1, wherein the copper layer comprises a first plated copper layer having a first copper layer thickness and a second plated copper layer contiguous with the first copper layer and having a second copper layer thickness, and wherein the copper layer thickness is the sum of the first and second copper layer thicknesses.

12. The method according to claim 1, comprising controlling the annealing temperature to allow the multiple-layer substrate to remain at a constant temperature level for the annealing residence time.

13. The method according to claim 3, wherein the annealing is performed in an annealing apparatus comprising the plurality of heating zones.

14. The method according to claim 6, further comprising etching on the copper layer with an acidic solution to produce an etched copper layer surface prior to plating the tin layer, such that adhesion of the tin layer is enhanced on the etched copper layer surface.

15. The method according to claim 1, wherein the multiple-layer substrate is a coinage blank.

16. The method according to claim 1, further comprising quenching the annealed substrate in order to stop metallic inter-diffusion, to produce a quenched substrate.

* * * * *